No. 699,758. Patented May 13, 1902.
F. M. HUDGINS.
COMBINED COTTON PLANTER AND FERTILIZER DISTRIBUTER.
(Application filed Sept. 26, 1901.)
(No Model.) 2 Sheets—Sheet 1.
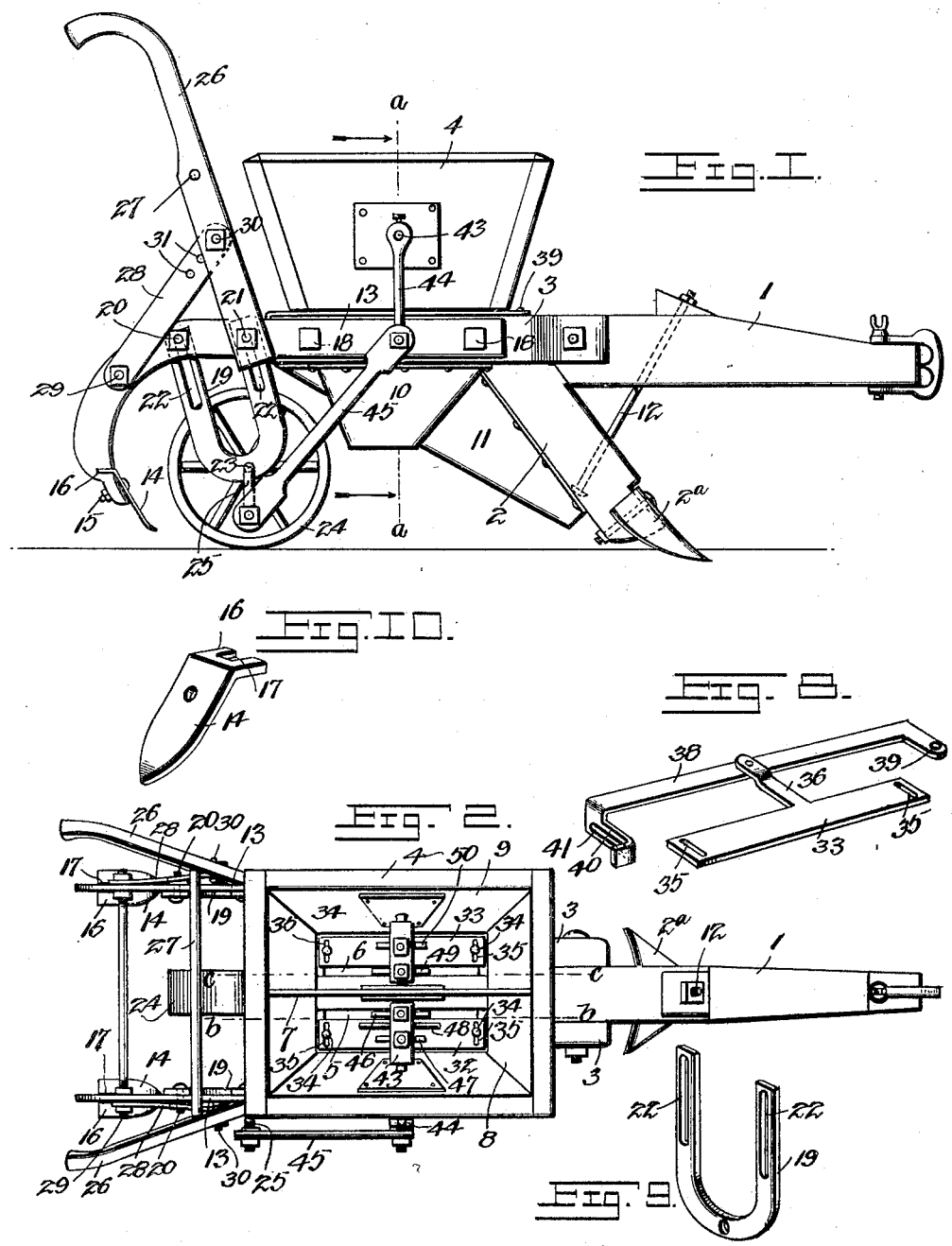

No. 699,758. Patented May 13, 1902.
F. M. HUDGINS.
COMBINED COTTON PLANTER AND FERTILIZER DISTRIBUTER.
(Application filed Sept. 26, 1901.)
(No Model.) 2 Sheets—Sheet 2.
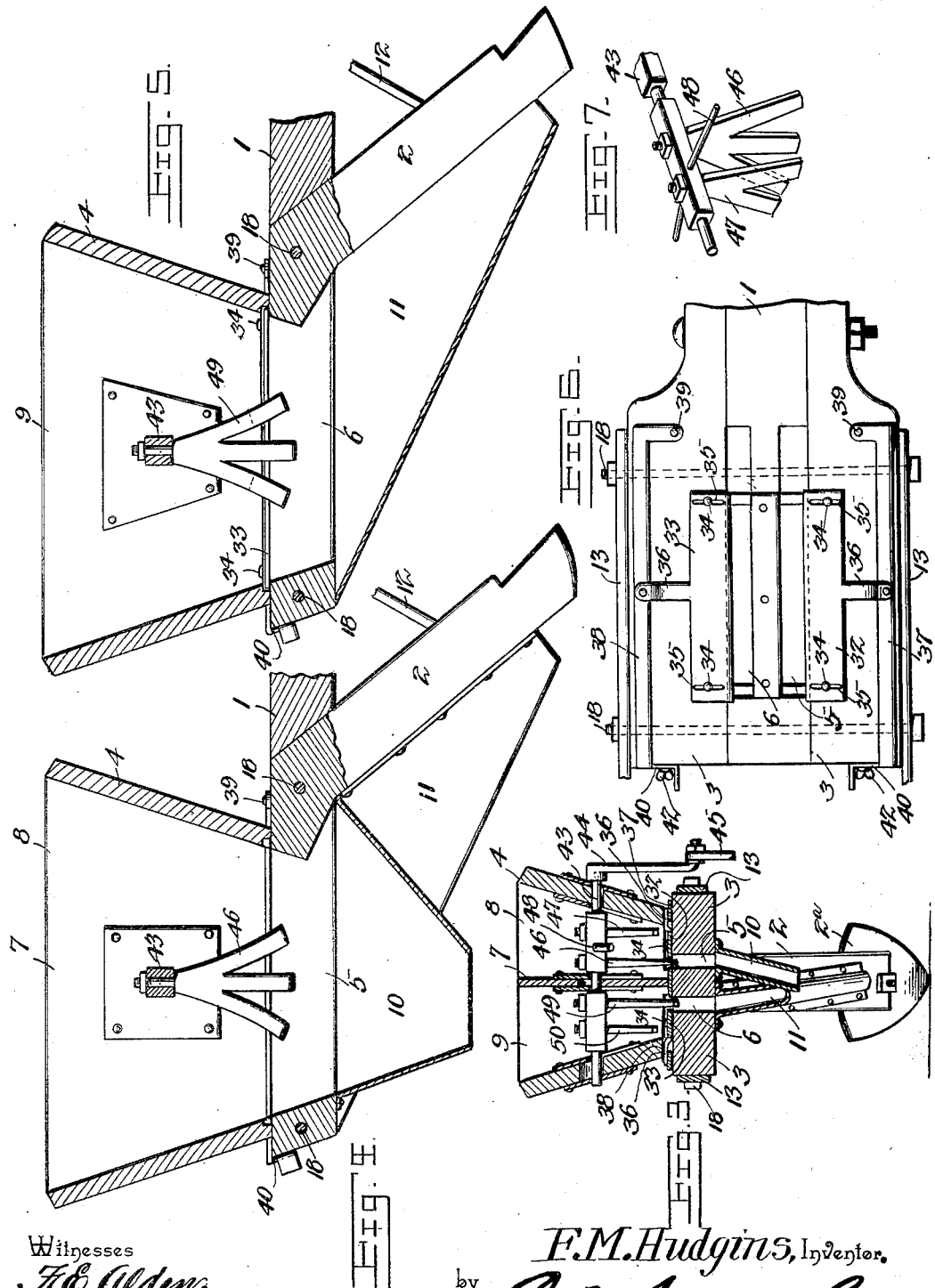
Witnesses
F. E. Alden
J. W. Garner
F. M. Hudgins, Inventor.
by C. A. Snow & Co.
Attorneys
THE NORRIS PETERS CO., PHOTO-LITHO., WASHINGTON, D. C.

UNITED STATES PATENT OFFICE.

FRANKLIN M. HUDGINS, OF VILLA RICA, GEORGIA, ASSIGNOR OF ONE-HALF TO BARNET L. EMBRY AND ELIAS RODGERS, OF VILLA RICA, GEORGIA.

COMBINED COTTON-PLANTER AND FERTILIZER-DISTRIBUTER.

SPECIFICATION forming part of Letters Patent No. 699,758, dated May 13, 1902.

Application filed September 26, 1901. Serial No. 76,683. (No model.)

*To all whom it may concern:*

Be it known that I, FRANKLIN M. HUDGINS, a citizen of the United States, residing at Villa Rica, in the county of Carroll and State of Georgia, have invented a new and useful Combined Cotton-Planter and Fertilizer-Distributer, of which the following is a specification.

My invention is an improved combined cotton-planter and fertilizer-distributer, the object of my invention being to provide an improved machine of this class which is adapted to deposit the fertilizer in the drills at some distance below the seeds, where it will be reached by the descending roots of the growing plants; and my invention consists in the peculiar construction and combination of devices hereinafter fully set forth and claimed.

In the accompanying drawings, Figure 1 is a side elevation of a combined cotton-planter and fertilizer-distributer embodying my improvements. Fig. 2 is a top plan view of the same. Fig. 3 is a vertical transverse sectional view of the same, taken on a plane indicated by the line $a\ a$ of Fig. 1. Fig. 4 is a vertical longitudinal sectional view of the same, taken through the seed-hopper on a plane indicated by the line $b\ b$ of Fig. 2. Fig. 5 is a similar view taken through the fertilizer-compartment of the hopper on a plane indicated by the line $c\ c$ of Fig. 2. Fig. 6 is a detail top plan view of the frame with the hopper removed, showing the cut-offs. Fig. 7 is a detail perspective view of the seed-agitator which operates in the seed-compartment of the hopper. Fig. 8 is a similar view of one of the cut-offs. Fig. 9 is a similar view of one of the adjustable standards for the driving-shaft. Fig. 10 is a similar view of one of the covering-plows.

To the beam 1 is secured the upper end of the standard 2, which carries the furrow-opening shovel $2^a$. On opposite sides of the beam, at the rear portion thereof, are bolted blocks 3. The upper sides of the said blocks are flush with the upper side of the beam, the said beam and said blocks forming a frame which supports the hopper 4. A vertical longitudinal opening 5 of suitable length and breadth is made in the beam 1 at a suitable distance from the rear end thereof, and a similar opening 6 is made in said beam on the side opposite the opening 5. The hopper is divided by a longitudinal partition 7 into a seed-compartment 8 and a fertilizer-compartment 9. The openings 5 6 are the discharge-openings for the said seed and fertilizer compartments, respectively. A discharge-spout 10 for the seeds depends from and is secured to the under side of the beam, is of the form shown, and its upper end registers with the opening 5. The said spout is inclined laterally downwardly, so that its lower end is disposed directly above the center of the furrow made by the furrow-opener $2^a$. A discharge-spout 11 is secured on the rear side of the standard 2 to the under side of the beam 1 and at its upper end registers with the fertilizer-discharge opening 6. The said fertilizer-discharge spout 11 extends downwardly and forwardly in advance of the seed-discharge spout 10 and at its lower front end terminates immediately in rear of the furrow-opening standard 2, so that the fertilizer will be deposited immediately behind the furrow-opener $2^a$ in the bottom of the furrow while the earth is being displaced laterally to form the furrow and at a point where it will be covered to a slight depth by the earth which closes in behind the shovel $2^a$ as the latter advances, so that the seeds dropped through the spout 10 will be above the fertilizer in the furrow. A bolt-rod 12 connects the standard 2 with the beam 1 at a point on the latter in advance of the upper end of standard.

On the outer sides of the blocks 3 are secured iron or steel beams 13, which have their rear ends turned downwardly to form standards that carry covering shovels or points 14. Each of the latter is secured by a bolt 15 and has its upper side extended rearwardly at 16 and provided with a notch 17 to receive the front side of the standard portion of the beam 13, to which it is attached. Thereby the said covering points or shovels are firmly secured against lateral displacement. The bolts 18, which secure the beams 13 to the blocks 3, pass through the said blocks and through the beam 1, as shown in Figs. 3 and 6. U-shaped standards 19 are secured to the inner sides of the beams 13 by bolts 20 21, which pass through openings or slots 22, with which the said standards 19 are provided. Thereby the said standards are secured to the said beams in such manner that they may be adjusted vertically. In the said standards 19 is journaled a shaft 23, on which is a combined traction and covering wheel 24. At one end of the said shaft is a crank 25. It will be understood by reference to Figs. 1 and 2 of the drawings that the wheel 24 runs in the furrow in rear of the standard 2 and the spouts which convey the fertilizer and seeds to the furrow and that the said wheel serves to partly cover the seeds and to embed the same compactly in the earth in the bottom of the furrow, in this respect acting as a roller, and that the points or shovels 14, which operate on opposite sides of and somewhat in rear of the said wheel, serve to cover the furrow and the seeds and fertilizer therein and form a ridge over the drill. The standards 19 being vertically adjustable, as hereinbefore stated, the wheel 24 may be disposed at any desired vertical adjustment to regulate the depth at which the furrow-opener and covering-shovels operate.

The handles 26 are connected together by a rung 27, and their lower ends are pivotally connected to the beams 13 by the bolts 21, which are also employed to secure the standards 19 to the said beams. Braces 28 have their lower ends pivotally connected to the standard portions of the beams 13 by bolts 29. The said braces are connected to the said handles 26 by bolts 30 and are provided with adjusting-openings 31, by means of which the said handles may be adjusted to and secured in any desired position.

On the blocks 3 are cut-off plates 32 33, which operate, respectively, over the openings 5 6 to regulate the quantity of the seed and fertilizer discharged from the respective compartments of the hopper or to cut off the discharge thereof. The bolts 34, which secure the said cut-off plates on the said blocks, operate in transverse slots 35 at the ends of said cut-off plates. The latter have outwardly-extending arms 36, which are connected to operating-rods 37 38, which adjust said plates, respectively. The front ends of the said operating-rods are pivotally secured on the blocks 3, as at 39. The rear ends of the said rods are provided with transverse portions 40, in which are slots 41, engaged by adjusting bolts or screws 42, by means of which said rods may be secured to hold the plates 32 33 at any desired adjustment, as will be understood. A rock-shaft 43 has its bearings in the sides of the hopper and in the partition 7. At one end of the said rock-shaft is a rock-arm 44, which is connected by a pitman 45 with the crank 25. The length of said rock-arm 44 exceeds that of said crank 25, and when the machine is in operation oscillating motion is imparted to the said rock-shaft 43, as will be understood. To the rock-shafts 43 is secured the downwardly-extending forked feed-arm 46, which operates in the seed-discharge opening 5. A similar shorter arm 47 is also secured to that portion of the rock-shaft 43 which is within the seed-compartment 8, the said arm 47 serving by the oscillating motion imparted thereto to stir the seeds and prevent them from lodging in the seed-compartment of the hopper. Stirring-arms 48 also project from opposite sides of the rock-shaft at a point between said arms 46 47 and are approximately horizontal, the said arms 48 coacting with the arms 46 47 to stir the seeds in the seed-compartment of the hopper. A feed-arm 49, which is identical in construction with the arm 46, is secured to that portion of the rock-shaft 43 which is within the fertilizer-compartment of the hopper and oscillates therein and in the fertilizer-opening 6. An arm 50, which is identical in construction with the arm 47, is also secured to said rock-shaft at a suitable distance on the outer side of the arm 49 and in connection with the latter serves to stir the fertilizer and prevent it from becoming lodged.

Having thus described my invention, I claim—

1. In a combined planter and fertilizer-distributer, the combination of a hopper having seed and fertilizer compartments with discharge-openings in the lower side thereof, laterally-movable cut-off plates under the bottom of the hopper and having each an outwardly-extending arm, a rearwardly-extending operating-arm, pivoted at its front end under the bottom of the hopper, connected to the arm of the cut-off plate to adjust the latter and having a transverse slotted portion at its rear end and a set-screw engaging said slotted transverse rear portion of the operating-arm, a furrow-opener standard, a pair of laterally and oppositely inclined seed and fertilizer spouts having their upper ends under said openings in the hopper and their lower ends disposed in the same vertical plane, said fertilizer-spout being on the rear side of the furrow-opener standard, extending downwardly thereon and discharging immediately behind and at the lower end of the same, so that the fertilizer will be covered in the bottom of the furrow, and said seed-spout having its discharge end at some distance in rear of and at a higher plane than that of the fertilizer-spout so that the seed will be dropped on the loose soil which covers the fertilizer in the furrow and kept out of contact with and above the fertilizer, for the purpose set forth, substantially as described.

2. In a planter, the combination of a hopper having a discharge-opening in its lower side, a laterally-movable cut-off plate under the bottom of the hopper and having an outwardly-extending arm, a rearwardly-extending operating-arm pivoted at its front end under the bottom of the hopper, connected to the arm of the cut-off plate to adjust the latter, and having a transverse, slotted portion at its rear end, and a set-screw engaging said slotted transverse rear portion of the operating-arm, substantially as described.

In testimony that I claim the foregoing as my own I have hereto affixed my signature in the presence of two witnesses.

FRANKLIN M. HUDGINS.

Witnesses:
W. A. FLOYD,
JOHN L. HUDGINS.